United States Patent [19]

Ochs et al.

[11] Patent Number: 4,825,903
[45] Date of Patent: May 2, 1989

[54] PRESSURE CONTROL VALVE

[75] Inventors: Rudolf Ochs, Frankfurt am Main; Michael Moeller, Eppstein; Wolfgang Nagl, Oberursel; Peter Gebhardt, Frankfurt am Main, all of Fed. Rep. of Germany

[73] Assignee: Alfred Teves GmbH, Frankfurt am Main, Fed. Rep. of Germany

[21] Appl. No.: 112,635

[22] Filed: Oct. 22, 1987

[30] Foreign Application Priority Data

Oct. 25, 1986 [DE] Fed. Rep. of Germany ....... 3636409

[51] Int. Cl.$^4$ .............................................. G05D 16/10
[52] U.S. Cl. ............................. 137/529; 137/505.25; 251/85
[58] Field of Search ........................ 137/529, 505.25; 251/85

[56] References Cited

U.S. PATENT DOCUMENTS 2,644,480  7/1953  Earle ................................. 137/529 X

FOREIGN PATENT DOCUMENTS

| 729945 | 3/1966 | Canada ................................ 137/529 |
| 28736 | 5/1981 | European Pat. Off. . |
| 1194668 | 1/1961 | Fed. Rep. of Germany . |
| 53485 | 1/1967 | Fed. Rep. of Germany . |
| 2527685 | 1/1977 | Fed. Rep. of Germany ...... 137/529 |
| 1383634 | 2/1975 | United Kingdom . |
| 1529866 | 10/1978 | United Kingdom . |
| 2157803 | 10/1985 | United Kingdom . |

*Primary Examiner*—Robert G. Nilson
*Attorney, Agent, or Firm*—James B. Raden

[57] ABSTRACT

A pressure control valve is disclosed including a housing, a valve seat, a valve closure member in the form of a ball loaded by a valve spring in a closing direction and controlling the communication between an inlet and an outlet of a pressure medium. So as to provide a pressure control valve which is simple in construction and low-cost manufacture and which is characterized by minimal noise formation a spring loaded guide element at least partially surrounds the valve closure member and axially and radially guides the valve ball, acted upon by a second spring.

2 Claims, 2 Drawing Sheets

PRESSURE CONTROL VALVE

BACKGROUND OF THE INVENTION

This invention relates to a pressure control valve. Pressure control valves are typically used in pressure differential valves, pressure relief valves, non-return valves and connecting valves.

The German Published Patent Application DE-OS No. 23 53 929, for example, discloses a non-return valve provided with a ball-spring arrangement. A disadvantage of such an arrangement is found in the fact that, due to insufficient guidance, ball vibrations occur in both axial and radial directions after the ball has lifted off from its valve seat. Such vibrations cause a considerable development of noise and, in particular, appear in case of high volume flows and/or high pressure gradients. The development of noise is particularly noticeable in the case of so-called breathers, that is, valves which open and close in rapid succession. One noise-abating arrangement includes providing washers or sleeves between the valve ball and the valve spring, however such an arrangement influences the valve's opening pressure (due to an increased prestress of the valve spring) and, thus, effects reliable operation of the valve. Also the noise-reducing effect is not totally satisfactory.

SUMMARY OF THE INVENTION

It is, therefore, an object of this invention to provide for a pressure control valve structure which functions with minimum noise and which is simple and low in cost to manufacture.

The objects of the invention are achieved according to the invention which provides structure which guides the ball and prevents vibrations in both the axial and radial directions.

According to one embodiment of the invention a guide element in the form of a guide sleeve is held at a shoulder by means of a second spring, with the valve closed. The guide sleeve includes a stop on its inside which limits the axial play of the valve closure member in the opening direction. Advantageously the guide sleeve stop enables the valve ball to be dampingly stopped after lifting-off of the valve without changing the valve characteristic.

Another advantageous embodiment of the invention provides for the second spring to have a considerably higher spring constant than the valve spring. Accordingly, the noise-minimizing features provided, by the spring loaded guide sleeve do not adversely affect the opening pressure and reliable operation of the valve.

According to another feature of the invention, the valve spring is narrowly guided radially which results in stabilization of the opening pressure. An important aspect of the invention provides for the second spring and the guide element to surround the valve spring. In order to minimize flow-induced influences on the valve closure member, an advantageous feature provides axially extending grooves on the inside wall of the guide sleeve. Another feature provides for the guide sleeve to have a polygonal cross-section with corners sized to fit into the respective bore.

In an embodiment wherein the guide sleeve is absent of inside axial grooves and has an outside polygonal cross-section, a transverse groove is provided at a stop face opposite the valve closure member so as to always ensure the flow of pressure medium.

According to a still further important feature the valve spring and the second spring can be arranged either in parallel with or axially behind each other.

BRIEF DESCRIPTION OF THE DRAWING

The invention and further advantageous characteristics of the invention will be understood from the following Detailed Description of a Preferred Embodiment and the drawing in which.

DETAIL DESCRIPTION OF A PREFERRED EMBODIMENT

Figure 1:
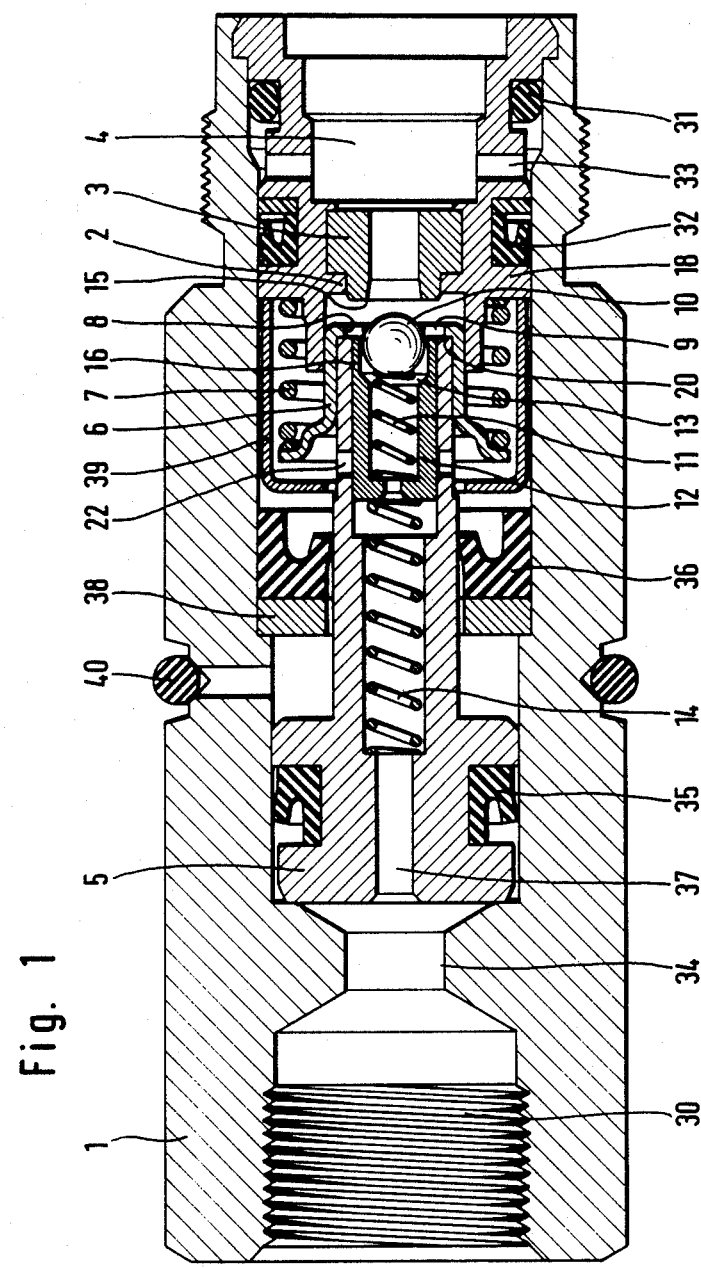
FIG. 1 is a cross sectional view of a preferred embodiment of the invention shown with reference to a pressure difference valve.

The pressure difference valve illustrated in FIG. 1 includes a housing 1 provided with a stepped central bore. The housing includes an inlet 4, an outlet 30, and an insert 18 at an inlet side. The insert is of a stepped design and is fixed fast to the housing. The insert 18 has annular surrounding grooves and projections on its outside surface area. The grooves and projections receive an O-ring 31 which forms a seal between the housing 1 and the insert 18. An overflow gasket 32 is arranged in a groove at a somewhat deeper point in the bore between the housing 1 and the insert 18. The insert 18 which is affixed fast with the housing has an annularly surrounding stop 2 radially projecting inwards into the central bore. A valve seat 3 rests against the stop 2 in a known way, and is engaged in a pressure-tight manner with the insert 18. The valve seat has one end designed as a flange pointing toward the inlet 4 and has its other end projecting beyond the stop 2, and provided with the sealing surface 15.

The overflow gasket 32 and the valve seat 3 fall approximately on a common radial plane. A transverse bore 33 is provided between the O-ring 31 and the overflow gasket 32 and radially extends through the insert 18. A piston 5 is provided in an axially displaceable manner in the central bore between a tappered section 34 of the central bore and the valve seat 3. The piston 5 has a central, axially extending through bore 37 and is designed as a differential piston. Accordingly, the end of the piston facing the outlet 30 has a larger pressure application surface than the end facing the inlet 4 and the valve seat 3. The part of the piston 5 which is provided with the larger diameter is sealed against the housing 1 by means of a ring seal 35 provided in a corresponding groove. The smaller-diameter area of the piston 5 passes through a ring 38 having its outside edge against a stop formed in the housing and through a ring seal 36 which rests against the ring 38 and forms a seal between the central bore and the piston 5. Arranged around the end of the piston 5 which faces toward the inlet 4 is the bowl-type spring retainer 6. At its outer edge, the bowl-type spring retainer 6 has a shoulder which centers and secures a compression spring 7 on the outside. The compression spring 7 supports itself at the bowl-type spring retainer 6, on the one hand, and on the insert 18, on the other hand. A bore 8 is provided at the bottom of the bowl-type spring retainer 6. The bore 8 is concentric with the through bore 37 of the piston 5. Radially outward directed slots 9 are provided in the spring retainer 6 at the circumference of the bore 8. The bore 8 has a smaller diameter than a ball-shaped valve closure member 10. A sleeve-shaped guide element 12 is guided in an axially displaceable manner in an enlarged diameter portion of the through bore 37 which points toward the valve seat 3. The guide element 12 is acted upon by a second spring 14 which is supported against a stop formed in through bore 37 of the piston 5. The spring 14 loads the guide element 12 in a closing direction and presses the guide element against the stop 20. Within the guide element 12, there is the valve closure member 10 which is loaded by a valve spring 11 supported on a shoulder within the guide element 12. The valve closure member 10 is forced into the bore 8 against the bowl-type spring retainer 6 when the pressure medium is unpressurized. A transverse bore 22 is provided the piston 5 approximately on the level of the outside edge of the bowl-type spring retainer 6. Between said transverse bore 22 and the ring seal 36 the piston 5 is surrounded with play by a cup 39 which is an assembly-assisting means. The cylindrical surface area of said cup 39 extends along the central bore up to the insert 18.

Between the two ring seals 35 and 36 there is a pressure-medium-free space to which a leakage bore is connected. The leakage bore is separated from the atmosphere by means of the sealing ring 40. By means of said leakage bore it is possible to check the sealing condition of the two ring seals.

In an unpressurized condition, the pressure differential valve is in the illustrated position of FIG. 1. Upon a certain pressure (charge-over pressure) being reached, the piston 5 is moved against the force of the compression spring 7 up to its stop 20. In doing so, the valve closure member 10 reaches the valve seat 3 and interrupts the communication between the inlet 4 and the outlet 30. On the outlet side, the pressure now remains constant until the inlet pressure overcomes the differential pressure as determined by the valve spring. With the pressure further increasing, the pressure difference remains constant between the inlet and outlet with the piston 5 remaining in its position at the stop 20. The valve closure member 10 rapidly opens and closes in succession, accordingly assuming a breathing condition.

During the so-called breathing operation, vibration-induced noises are prevented due to the fact that the two springs 14 and 11 are arranged behind each other as well as due to the fact that the valve closure member 10 is stopped in a damped manner and guided in the axial and radial directions.

Upon a pressure reduction on the inlet side, the piston 5 at first remains in its previously adopted position for example against the stop 20. Pressure reduction is brought about by the pressure medium flowing past the overflow gasket 32, and resupplied to the inlet 4 through the transverse bore 33. At approximately, but somewhat below the change-over pressure due to friction losses in the seals, the compression spring 7 displaces the piston 5 against the taper 34, thus releasing the valve member 10 from the valve seat 3.

Figure 2:
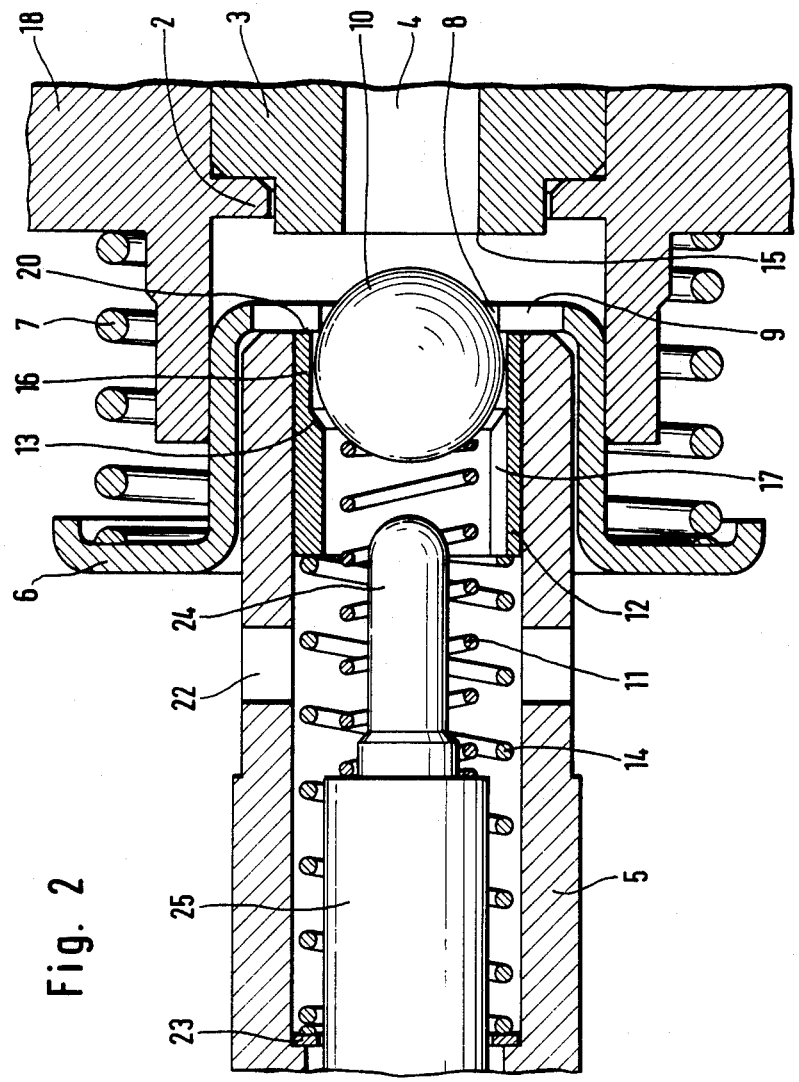
FIG. 2 is a partial cross sectional view of a pressure difference valve employing an alternative valve arrangement according to the invention.

FIG. 2 shows in detail a ball-spring arrangement of a pressure differential valve similar to FIG. 1. The insert 18 which is arranged fast with the housing has an annularly surrounding stop 2 projecting into the central bore. Resting against one side of the stop 2 is the valve seat 3 which, in the known way, is sealed in a pressure-tight manner with the insert 18. The other end of the valve seat 3 is provided with a flange having a sealing surface 15. The flange and sealing surface project axially beyond the stop 2 into the central bore.

The piston 5 and the bowl-type spring retainer 6 arranged around the end of piston pointing toward the inlet are provided displaceably in the central bore of the housing. The piston 5 is designed as a differential piston and has a larger pressure application surface at its end which points toward the outlet, not shown in FIG. 2, than at its end which points toward the inlet. The bowl-type spring retainer 6 has a shoulder on its outer edge. The shoulder centers and secures the compression spring 7 on the outside, which compression spring 7 is supported at the bowl-type spring retainer 6, on the one hand, and at the insert 18, on the other hand. A bore 8 is provided at the bottom of the bowl-type spring retainer 6. Radially outward directed slots 9 are provided at the circumference of the said bore 8. The bore 8 has a smaller diameter than the ball-shaped valve closure member 10. A spring guiding pin 25 is affixed in the piston 5 which is designed as a hollow cylinder. The attachment of the guide pin is such that the passage of pressure medium is not affected. The end of said spring guiding pin 25 which points toward the inlet 4 and the valve closure member 10 is in the shape of a tappet 24 having a reduced diameter and a rounded end. The valve spring 11 is supported at the shoulder formed at the point of transition between the pin 25 and tappet 24. The other end of the valve spring 11 acts on the valve closure member 10.

The valve closure member 10 is forced into the bore 8 against the bowl-type spring retainer 6 when the pressure control valve is not pressurized. The valve closure member 10 and the valve spring 11 are partially surrounded by the sleeve-shaped guide element 12 which is arranged between the closure member and spring and the piston 5. In the pressureless condition of the valve, the force of a second spring 14 keeps the valve closure member 10 and the valve spring 11 at the stop 20 formed by the slotted part of the bottom of the bowl-type spring retainer 6.

Accordingly, the second spring 14 is arranged, prestressed, between a supporting washer 23 and the guide element's 12 front face. In this arrangement, the distance between the retaining ring 23 and the guide element 12 is dimensioned so as to ensure that the second spring 14 encircles both the valve spring 11 and the larger-diameter part of the spring guiding pin 25.

The guide element has an area 16 with an enlarged diameter approximately corresponding to the diameter of the valve closure member 10. The enlarged diameter is provided at the end of the guide element facing in the direction of the inlet. The guide element 12 is tappered internally from the enlarged diameter to a diameter corresponding approximately to the outside diameter of the valve spring 11 forming a stop 13.

A certain axial play is provided between the stop 13 and the valve closure member 10 when the closure member is resting in the bore 8 under the influence of the valve spring 11. Several axially extending grooves 17 are provided in and distributed around the inside of the guide element 12.

Operation of the pressure control valve and in particular with regard to the spring-ball arrangement, is as follows. In the unpressurized condition the pressure control valve is in the position shown in FIG. 2. When a pressure is built up, because the piston 5 is designed as a differential piston, the piston 5 moves against the force of the compression spring 7 toward the valve seat until the bottom of the bowl-type spring retainer 6 comes to abut on the valve seat 3. However, before the bowl-type spring retainer 6 touches the valve seat 3, the valve closure member 10, which is loaded by the valve spring 11, is pressed against the sealing surface 15. The compression spring 7 determines the pressure (change-over pressure) at which the valve 10 contacts the sealing surface and thus the pressure at which the pressure difference is to be maintained, as determined by the valve spring 11.

Upon further pressure increase, the piston 5 remains in its position against the valve seat 3 and only the valve closure member 10 rapidly, repeatedly opens and closes the passage through the valve seat 3. The force required on the valve closure member 10 in order to move the closure member and open the passage in the valve seat 3 under the influence of the inlet pressure must exceed the resulting force due to the outlet pressure and of the valve spring 11 which pressurizes the valve closure member 10 in the closing direction.

So as to avoid undesired vibrations of the valve closure member 10 during this control operation, that is, the so-called breathing operation, the valve closure member 10 is guided axially and radially within the guide element 12. If unguided, undesired vibrations of the ball result from unstable hydro-dynamic conditions in the area of the valve ball.

When the change-over pressure is reached, the fact that the passage through the valve seat 3 has a smaller diameter than the bore 8 causes the valve closure member 10 to be seated on the sealing surface 15 before the bottom of the bowl-type spring retainer 6 comes to abut on the valve seat 3. After the differential pressure has been reached, the bowl-type spring retainer 6, the guide element 12 and the piston 5 move until they abut on the valve seat 3. So as to not impair movement, axial play is provided between the stop 13 and the valve closure member 10.

The second spring 14 is dimensioned stiffer than the valve spring 11 so as to not influence the differential pressure as predetermined by the valve spring 11. In case of greater vibrations of the valve closure member 10 due to the rapid and greater pressure medium flow during or after the "breathing operation", the valve closure member 10 is dampingly stopped by the guide element 12 and guided both axially and radially. Accordingly, vibrations of the valve closure member 10 which otherwise lead to formation of considerable noise are suppressed without the operation of the valve being influenced.

The axially extending grooves 17 are provided so as to maintain a free flow cross-section at the stop 13 when the valve closure member 10 is in abutment with the stop. If desired, the guide element can have a polygonal cross-section with corners sized to fit into the respective bore.

Due to the fact that the valve spring is surrounded by the area of reduced diameter of the guide element 12, the valve spring 11 is prevented from slipping away. Advantageously, the differential pressure of the valve is maintained more exactly. The noise-abating structure does not preclude accurate determination of the spring-to-mass ratio of the valve as the guide element 12 and the second spring 14 only perform a damping type stopping function after the valve closure member has travelled a certain opening stroke as predetermined by the axial play between the stop 13 and the valve closure member.

In a non-represented embodiment of the invention according to FIG. 2, an annularly surrounding groove can be provided at the front face of the guide element 12 facing toward the second spring 14 for radially guiding the second spring 14.

What is claimed is:

1. A pressure control valve, comprising a housing, a valve seat in said housing, a ball-shaped valve closure member loaded and acted upon by a first valve spring in a closing direction toward said valve seat, said closure member and said valve seat controlling hydraulic communication of a pressure medium between an inlet and an outlet of said housing, said valve closure member at least partially surrounded by a guide element, said guide element acted upon by a second spring in a closing direction and wherein first valve spring and said second spring each act in a direction in opposition to the direction of pressure flow through said pressure control valve and wherein the first valve spring and the second spring are arranged in parallel.

2. A pressure control valve, comprising a housing, a valve seat in said housing, a ball-shaped valve closure member loaded by a first valve spring in a closing direction toward said valve seat, said closure member and said valve seat controlling hydraulic communication of a pressure medium between an inlet and an outlet of said housing, said valve closure member at least partially surrounded by a guide element, said guide element acted upon by a second spring in a closing direction, wherein the guide element is a guide sleeve including a stop on an inner surface defining a predetermined axial play of the valve closure member in an opening direction, and wherein the guide sleeve is provided with a plurality of axially extending grooves on said inner surface.

* * * * *